(12) United States Patent
Halimi

(10) Patent No.: US 12,717,360 B2
(45) **Date of Patent: *Aug. 25, 2026**

(54) FLUID MONITORING AND CONTROL SYSTEM

(71) Applicant: Fortune Brands Water Innovations LLC, North Olmsted, OH (US)

(72) Inventor: Henry M. Halimi, Los Angeles, CA (US)

(73) Assignee: Fortune Brands Water Innovations LLC, North Olmsted, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/958,599

(22) Filed: Nov. 25, 2024

(65) Prior Publication Data

US 2025/0085726 A1 Mar. 13, 2025

Related U.S. Application Data

(63) Continuation of application No. 18/448,655, filed on Aug. 11, 2023, now Pat. No. 12,314,063, which is a (Continued)

(51) Int. Cl.
*G05D 16/20* (2006.01)
*E03B 7/07* (2006.01)

(Continued)

(52) U.S. Cl.
CPC ........... *G05D 16/20* (2013.01); *F16K 31/042* (2013.01); *F16K 37/005* (2013.01);

(Continued)

(58) Field of Classification Search
CPC ...... G05D 16/20; G05D 7/0635; G05D 7/078; F16K 31/042; F16K 37/005; E03B 7/078; Y10T 137/7761

(Continued)

(56) References Cited

U.S. PATENT DOCUMENTS 4,418,712 A 12/1983 Braley
4,546,671 A 10/1985 Fry (Continued)

FOREIGN PATENT DOCUMENTS

CA 2509019 10/2005
CN 102587468 B 11/2014

(Continued)

OTHER PUBLICATIONS

Pacific Gas and Electric Company, SmartMeter System—How It Works, archived web page from Jul. 12, 2010, available at https://web.archive.org/web/20100712031615/https:/www.pge.com/myhome/customerservice/smartmeter/howitworks/.

(Continued)

*Primary Examiner* — William M McCalister
(74) *Attorney, Agent, or Firm* — Calfee, Halter & Griswold LLP

(57) ABSTRACT

A fluid control device includes a fluid pipe section, a fluid valve assembled with the fluid pipe section, a flow rate sensor connected to the fluid pipe section monitoring a flow rate of the liquid fluid flow within the fluid pipe section, a control device processor electrically connected to the flow rate sensor to receive flow measurement signals from the flow rate sensor and operable to control movement of the fluid valve to a shutoff condition, and a wireless communication transmitter electrically connected to the control device processor. In response to the control device processor identifying from the flow measurement signals a flow condition exceeding a predetermined flow threshold, the control device processor performs at least one of controlling movement of the fluid valve to the shutoff condition and controlling wireless transmission of a user alert from the wireless communication transmitter.

20 Claims, 5 Drawing Sheets

Related U.S. Application Data continuation of application No. 17/649,363, filed on Jan. 30, 2022, now Pat. No. 11,762,400, which is a continuation of application No. 16/948,713, filed on Sep. 29, 2020, now Pat. No. 11,237,574, which is a continuation-in-part of application No. 15/849,669, filed on Dec. 21, 2017, now Pat. No. 10,866,601, which is a continuation of application No. 14/182,213, filed on Feb. 17, 2014, now Pat. No. 9,857,805.

(60) Provisional application No. 61/766,105, filed on Feb. 18, 2013, provisional application No. 62/909,176, filed on Oct. 1, 2019.

(51) Int. Cl.
*F16K 31/04* (2006.01)
*F16K 37/00* (2006.01)
*G05D 7/06* (2006.01)

(52) U.S. Cl.
CPC ............ *G05D 7/0635* (2013.01); *E03B 7/078* (2013.01); *Y10T 137/7761* (2015.04)

(58) Field of Classification Search
USPC ...................................................... 137/487.5
See application file for complete search history.

(56) References Cited

U.S. PATENT DOCUMENTS 5,007,453 A 4/1991 Berkowitz et al.
5,038,268 A 8/1991 Krause
5,038,821 A 8/1991 Maget
5,660,198 A 8/1997 McClaran
5,719,564 A 2/1998 Sears
5,752,025 A 5/1998 Shakib
5,771,920 A * 6/1998 Jewett ................ G01M 3/2807 137/460
5,794,653 A 8/1998 DeSmet
5,821,636 A 10/1998 Baker
5,927,400 A 7/1999 Bononi et al.
5,971,011 A 10/1999 Price
5,983,164 A 11/1999 Ocondi
6,073,644 A 6/2000 Friedman
6,181,257 B1 1/2001 Meek et al.
6,186,162 B1 2/2001 Purvis
6,216,105 B1 4/2001 Pan
6,216,727 B1 4/2001 Genova
6,237,618 B1 5/2001 Kushner
6,246,677 B1 6/2001 Patel
6,374,846 B1 4/2002 DeSmet
6,392,592 B1 5/2002 Johnson et al.
6,404,345 B1 6/2002 Frasier
6,489,895 B1 12/2002 Apelman
6,526,807 B1 3/2003 Doumit et al.
6,539,968 B1 4/2003 White
6,556,142 B2 4/2003 Dunstan
6,655,413 B2 12/2003 Condon et al.
6,789,411 B2 9/2004 Roy
6,944,523 B2 9/2005 Addink et al.
6,963,808 B1 11/2005 Addink et al.
6,994,309 B2 2/2006 Fernandez-Sein
7,012,546 B1 3/2006 Zigdon et al.
7,103,511 B2 9/2006 Petite
7,119,698 B2 10/2006 Schleich et al.
7,174,771 B2 2/2007 Cooper
7,304,587 B2 12/2007 Boaz
7,308,824 B2 12/2007 Trescott, Jr. et al.
7,310,052 B2 12/2007 Bowman
7,317,404 B2 1/2008 Cumeralto et al.
7,330,796 B2 2/2008 Addink et al.
7,360,413 B2 4/2008 Jeffries et al.
7,383,721 B2 6/2008 Parsons et al.
7,424,399 B2 9/2008 Kahn et al.
7,426,875 B1 9/2008 McMillan
7,574,896 B1 8/2009 Cooper
7,711,796 B2 5/2010 Gutt et al.
7,920,983 B1 4/2011 Peleg et al.
7,966,099 B2 6/2011 Fima
7,969,318 B2 6/2011 White et al.
8,073,931 B2 12/2011 Dawes et al.
8,086,702 B2 12/2011 Baum et al.
8,086,703 B2 12/2011 Baum et al.
8,122,131 B2 2/2012 Baum et al.
8,209,400 B2 6/2012 Baum et al.
8,214,496 B2 7/2012 Gutt et al.
8,269,651 B2 9/2012 Zigdon et al.
8,333,361 B2 12/2012 McTargett
8,335,842 B2 12/2012 Raji et al.
8,347,427 B2 1/2013 Klicpera
8,402,984 B1 3/2013 Ziegenbein
8,439,062 B1 5/2013 Ziegenbein
8,451,986 B2 5/2013 Cohn et al.
8,473,619 B2 6/2013 Baum et al.
8,477,011 B2 7/2013 Tubb et al.
8,478,844 B2 7/2013 Baum et al.
8,478,871 B2 7/2013 Gutt et al.
8,489,342 B2 7/2013 Dugger et al.
8,539,827 B2 9/2013 Benson et al.
8,612,591 B2 12/2013 Dawes et al.
8,621,206 B2 12/2013 Chang
8,635,499 B2 1/2014 Cohn et al.
8,638,211 B2 1/2014 Cohn et al.
8,644,804 B2 2/2014 Blackwell et al.
8,644,960 B2 2/2014 Laflamme et al.
8,701,703 B2 4/2014 Scott et al.
8,713,132 B2 4/2014 Baum et al.
8,819,178 B2 8/2014 Baum et al.
8,825,871 B2 9/2014 Baum et al.
8,833,390 B2 9/2014 Ball et al.
8,836,467 B1 9/2014 Cohn et al.
8,866,634 B2 10/2014 Williamson et al.
8,878,690 B2 11/2014 Olson et al.
8,887,324 B2 11/2014 Klicpera
8,893,320 B2 11/2014 Klicpera et al.
8,907,810 B2 12/2014 Belz et al.
8,958,922 B2 2/2015 Blank et al.
8,963,713 B2 2/2015 Dawes et al.
8,988,221 B2 3/2015 Raji et al.
8,996,665 B2 3/2015 Baum et al.
9,019,120 B2 4/2015 Broniak et al.
9,047,753 B2 6/2015 Dawes et al.
9,059,863 B2 6/2015 Baum et al.
9,061,307 B2 6/2015 Klicpera et al.
9,100,446 B2 8/2015 Cohn et al.
9,139,986 B2 9/2015 Smith et al.
9,141,276 B2 9/2015 Dawes et al.
9,144,143 B2 9/2015 Raji et al.
9,147,337 B2 9/2015 Cohn et al.
9,172,553 B2 10/2015 Dawes et al.
9,253,754 B2 2/2016 Sanderford, Jr.
9,254,499 B2 2/2016 Klicpera
9,266,136 B2 2/2016 Klicpera
9,297,150 B2 3/2016 Klicpera
9,390,381 B2 7/2016 Davari et al.
9,489,484 B2 11/2016 van Dal
9,494,480 B2 11/2016 Klicpera
9,568,391 B2 2/2017 Linford et al.
9,632,514 B2 4/2017 Marty et al.
9,709,421 B2 7/2017 Blackwell et al.
9,749,792 B2 8/2017 Klicpera
9,777,470 B2 10/2017 Mazz et al.
9,857,805 B2 1/2018 Halimi
9,910,578 B2 3/2018 Freier et al.
9,928,724 B2 3/2018 Alcorn et al.
10,094,732 B2 10/2018 Linford
10,489,038 B2 11/2019 Klicpera
10,626,583 B2 4/2020 Mazz et al.
10,866,601 B2 12/2020 Halimi
10,962,993 B2 3/2021 Halimi
11,095,960 B2 8/2021 Klicpera
11,105,705 B1 8/2021 Lowitz
11,237,574 B2 2/2022 Halimi

(56) References Cited

U.S. PATENT DOCUMENTS 11,549,837 B2 1/2023 Klicpera
11,762,400 B2 * 9/2023 Halimi .................. F16K 37/005 137/487.5
12,314,063 B2 * 5/2025 Halimi ................... G05D 16/20
2001/0003286 A1 6/2001 Philippbar et al.
2004/0177703 A1 9/2004 Schumacher
2004/0193329 A1 9/2004 Ransom et al.
2005/0016592 A1 1/2005 Jeromson et al.
2005/0067049 A1 3/2005 Fima
2005/0278409 A1 12/2005 Kutzik et al.
2006/0028355 A1 2/2006 Patterson et al.
2006/0137090 A1 6/2006 Jeffries et al.
2007/0152074 A1 7/2007 Stowe et al.
2007/0289635 A1 12/2007 Ghazarian et al.
2008/0149180 A1 6/2008 Parris et al.
2008/0183842 A1 7/2008 Raji et al.
2009/0070682 A1 3/2009 Dawes et al.
2009/0096586 A1 4/2009 Tubb
2009/0165866 A1 7/2009 Fima
2010/0082744 A1 4/2010 Raji et al.
2010/0114386 A1 5/2010 Fima
2010/0207017 A1 8/2010 Horiuchi et al.
2010/0289652 A1 11/2010 Javey
2011/0035063 A1 2/2011 Palayur
2011/0298635 A1 12/2011 Yip
2011/0303311 A1 12/2011 Klicpera
2011/0320134 A1 12/2011 Butler et al.
2012/0037725 A1 2/2012 Verfuerth
2012/0180877 A1 * 7/2012 Pallais .................. G01M 3/002 73/49.1
2012/0255344 A1 10/2012 Hart et al.
2013/0080081 A1 3/2013 Dugger et al.
2013/0167938 A1 7/2013 Stimpson
2014/0130878 A1 * 5/2014 Marinez .................... F17D 3/01 137/487.5
2014/0230925 A1 8/2014 Halimi
2014/0250590 A1 9/2014 Keiter et al.
2014/0306828 A1 10/2014 Trescott
2014/0348205 A1 11/2014 Shaw
2015/0376874 A1 12/2015 Breedlove
2018/0031142 A1 * 2/2018 Hillo ..................... F16K 31/042
2018/0136673 A1 5/2018 Halimi
2018/0259982 A1 9/2018 Halimi
2018/0347157 A1 * 12/2018 Brotherton .............. E03B 7/072
2019/0323919 A1 * 10/2019 Fung-A Wing ........... E03B 7/07
2019/0332990 A1 10/2019 Klicpera
2020/0032494 A1 1/2020 Trescott
2021/0011500 A1 1/2021 Halimi
2022/0155804 A1 5/2022 Halimi
2025/0085726 A1 3/2025 Halimi

FOREIGN PATENT DOCUMENTS

EP 724044 A1 7/1996
EP 882848 B1 5/2003
JP 5034875 B2 5/1993
JP 5679842 B2 3/2015
JP 5782631 B2 9/2015
WO 2001095277 12/2001
WO 2007024894 A2 3/2007
WO 2009103729 A1 8/2009
WO 2015178904 A1 11/2015
WO 2020154384 7/2020

OTHER PUBLICATIONS

FloLogic System 3.0 User Manual (Rev.2012), 36 pages, published 2012.

Request for Ex Parte Reexamination 90/015,544 dated Sep. 25, 2025.

Order Granting Request for Ex Parte Reexamination 90/015,544 dated Oct. 21, 2025.

Office action from U.S. Appl. No. 19/317,479 dated Dec. 31, 2025.

Communication from Reexamination 90/015,544 dated Jan. 21, 2026.

Notice of Intent to Issue Reexam Certificate from U.S. Appl. No. 90/015,544 dated Jun. 17, 2026.

Response submitted with U.S. Appl. No. 90/015,544 dated May 28, 2026.

Final Rejection from U.S. Appl. No. 90/015,544 dated Apr. 28. 2026.

* cited by examiner

FLUID MONITORING AND CONTROL SYSTEM

CROSS-REFERENCE TO RELATED APPLICATIONS

This application is a continuation of U.S. application Ser. No. 18/448,655, filed Aug. 11, 2023, which is a continuation of U.S. application Ser. No. 17/649,363, filed on Jan. 30, 2022 and issued as U.S. Pat. No. 11,762,400 on Sep. 19, 2023, which is a continuation of U.S. application Ser. No. 16/948,713, filed on Sep. 29, 2020 and issued as U.S. Pat. No. 11,237,574 on Feb. 1, 2022, which is a continuation-in-part of U.S. application Ser. No. 15/849,669 filed on Dec. 21, 2017 and issued as U.S. Pat. No. 10,866,601 on Dec. 15, 2020, which is a continuation of application Ser. No. 14/182,213 filed on Feb. 17, 2014 and issued as U.S. Pat. No. 9,857,805 on Jan. 2, 2018, which claims priority to provisional application 61/766,105 filed on Feb. 18, 2013. Continuation in-part U.S. application Ser. No. 16/948,713 also claims priority to provisional application 62/909,176 filed on Oct. 1, 2019. The contents of all these applications are fully incorporated by reference herein.

TECHNICAL FIELD

The present disclosure generally relates to fluid monitoring and control systems and devices.

BACKGROUND

The plumbing industry has lagged behind its related industries in development of fundamentally new and innovative technologies in recent decades. Due to the passive nature of fluids, the delivery of liquid, gas and air has hardly changed since their initial development decades ago. Improvements in the industry have traditionally been focused on product redesigns and the use of modified materials. The net effect of this stagnation has become aging product lines and sagging margins. Emergence of environmental, health, safety, conservation and also the increasing need for water damage mitigation has created enormous untapped opportunities.

Furthermore, there are no practical solutions for detection of very small leaks in the plumbing systems. These leaks cause hundreds of millions of dollars in mold and property damage in United States alone.

Accordingly, there is a need for a system that alleviates the problems in the prior art. The present invention fulfills these needs and provides other related advantages.

SUMMARY OF THE INVENTION

An embodiment of a fluid control device has a fluid pipe section including a fluid inlet and a fluid outlet configured to be connectable in series to a fluid pipe. A fluid valve is coupled in series within the fluid pipe section separating a fluid inlet side from a fluid outlet side. The fluid inlet side corresponds to the fluid inlet of the fluid pipe section and the fluid outlet side corresponds to the fluid outlet of the fluid pipe section. The fluid valve controls a fluid flow through the fluid pipe section.

An electric motor is mechanically connected to the fluid valve. At least one sensor is coupled to the fluid pipe section. The at least one sensor comprises: a temperature sensor monitoring a temperature of the fluid flow within the fluid pipe section; a pressure sensor monitoring a pressure of the fluid flow within the fluid pipe section; and/or a flow rate sensor monitoring a flow rate of the fluid flow within the fluid pipe section;

A control device processor is controllably and electrically connected to the electric motor and electrically connected to the at least one sensor. A communication device is coupled to the control device processor, the communication device configured to be wirelessly connectable to a remotely disposed fluid monitoring and control system.

The control device processor is configured to enter into a pre-occupancy mode when powered and never previously wirelessly connected to the fluid monitoring and control system. The pre-occupancy mode is configured to fully close the fluid valve if at least one of the following occurs: exceeding a first preset threshold for a pressure decay test; exceeding a second preset threshold for a maximum flow rate; exceeding a third preset threshold for a maximum flow duration; exceeding a fourth preset threshold for a maximum flow volume; exceeding below a fifth preset threshold for a low temperature; exceeding above a sixth preset threshold for a high temperature; and/or exceeding above a seventh preset threshold for a high pressure.

In other embodiments, if the pre-occupany mode closes the fluid valve, the control device processor may be configured to illuminate an LED or a display, the LED or the display being electrically connected to the control device processor.

In other embodiments, if the pre-occupany mode closes the fluid valve, the control device processor is configured to sound an audible alarm by a speaker 61, the speaker being electrically connected to the control device processor.

The fluid control device may be configured to be in wireless communication with a second fluid control device disposed a distance apart. The second fluid control device may be configured to illuminate an LED or a display or sound an audible alarm by a speaker if the fluid control device has shut the fluid valve, wherein the LED, the display or the audible alarm is electrically connected to a control device processor of the second fluid control device.

The fluid control device may be configured to exit the pre-occupancy mode when the fluid control device is wirelessly connected to the fluid monitoring and control system and a user has requested the pre-occupancy mode be turned off.

The communication device may comprise a wireless communication transmitter and receiver configured to wirelessly communicate with the fluid monitoring and control system. The transmitter and receiver may be integrated inside the housing, such that no external modular units are needed.

A housing may enclose at least the electric motor and the control device processor.

The fluid flow may comprise a liquid flow, a gas flow, an air flow or a combination thereof.

A battery or a power input may be electrically connected to the control device processor.

The pressure sensor may be disposed on the fluid outlet side of the fluid valve and wherein no pressure sensor is disposed on the fluid inlet side of the fluid valve. The flow rate sensor may be a turbine wheel. The fluid valve may be a ball valve.

The temperature sensor and the pressure sensor may both be disposed on the fluid outlet side of the fluid valve.

The temperature sensor, the pressure sensor and the flow rate sensor may be all disposed on the fluid outlet side of the fluid valve.

The fluid monitoring and control device may comprise a portable electronic device, a computer or a smart phone.

In another embodiment, a fluid monitoring and control system includes a central hub having a central processor, a user interface electronically coupled to the central processor and an input/output port electronically coupled to the central processor. A plurality of control devices communicate with the central hub. Each control device includes a fluid pipe section including a fluid inlet and a fluid outlet configured to be connectable in series to a fluid pipe. A fluid valve is coupled in series within the fluid pipe section, the fluid valve controlling a fluid flow through the fluid pipe section. An electric motor is mechanically connected to the fluid valve. A temperature sensor is coupled to the fluid pipe section monitoring a temperature of the fluid flow within the fluid pipe section. A pressure sensor is coupled to the fluid pipe section monitoring a pressure of the fluid flow within the fluid pipe section. A flow rate sensor is coupled to the fluid pipe section monitoring a flow rate of the fluid flow within the fluid pipe section. A control device processor is controllably connected to the electric motor, temperature sensor, pressure sensor and flow sensor. A control device input/output port is coupled to the control device processor, the control device input/output port in communication with the input/output port of the central hub. The fluid flow through any individual device may be a liquid flow, a gas flow, an air flow or a combination thereof.

In other exemplary embodiments a housing may enclose at least the electric motor and control device processor.

In other exemplary embodiments a control device wireless communication transmitter and receiver may be connectable to the control device input/output port.

In other exemplary embodiments a proximity sensor or a moisture sensor may be in communication with the central hub.

In other exemplary embodiments the input/output port of the central hub may include a central hub wireless communication transmitter and receiver in communication with the control device wireless communication transmitter and receiver.

In other exemplary embodiments the user interface may be a computer screen and a keyboard or a touch activated computer screen. The user interface may be a website accessible from a remote computer, a fire alarm system, a burglar alarm system, a mobile computer or a portable electronic device.

In other exemplary embodiments a communication wire may be connected physically between the input/output ports of the central hub and control device. In other exemplary embodiments a battery may be coupled to the control device processor. In other exemplary embodiments a power input may be electrically connected to the control device processor.

In other exemplary embodiments a speaker may be electrically connected to the central hub processor for sounding a warning sound. In other exemplary embodiments a light may be electrically connected the central hub processor for illuminating a warning light.

An exemplary method of fluid control includes providing a fluid monitoring and control system having the central hub and the plurality of control devices discussed herein and also installing software on the central processor of the central hub controlling the plurality of controlling devices, programming into the software a temperature threshold, a pressure threshold or a flow rate threshold of the fluid flow for at least one control device of the plurality of devices, automatically monitoring the temperature, the pressure and the flow rate of the fluid flow of the at least one control device of the plurality of devices by the software, and automatically closing the respective fluid valve of the at least one control device of the plurality of control devices by the software wherein either the temperature, the pressure or the flow rate threshold was exceeded.

In other exemplary embodiments the step of programming into the software the temperature threshold, the pressure threshold or the flow rate threshold of the fluid flow for at least one control device of the plurality of devices may include automatically monitoring the temperature, the pressure and the flow rate of the fluid flow by the software for a defined learning period of time and automatically establishing the temperature threshold, the pressure threshold or the flow rate threshold by the software during the defined learning period of time.

In other exemplary embodiments it may include the step of automatically alerting the user by the software when either the temperature, the pressure or the flow rate exceeds at least one of the thresholds, where the step of automatically alerting the user comprises a warning light, a warning sound, a text message, an email, a pager notification, a voicemail or other electronic communication means.

In other exemplary embodiments it may include the step of automatically closing a fluid valve of at least one control device of the plurality of devices by the software for a defined test period of time when a threshold has not been exceeded, and including the step of monitoring a pressure decay during the defined test period of time, and including the step of automatically closing the respective fluid valve of the at least one control device of the plurality of control devices when the pressure decay during the defined test period of time exceeds a predefined pressure decay threshold.

In other exemplary embodiments it may include providing a moisture sensor in communication with the central processor of the central hub and including the step of automatically closing a fluid valve of a respective control device of the plurality of devices when the moisture sensor detects a leak.

In other exemplary embodiments it may include providing a proximity sensor in communication with the central processor of the central hub. Furthermore, this may include providing a second temperature threshold, a second pressure threshold or a second flow rate threshold utilized for monitoring by the software, and including the step of the user commanding the software to utilize the second thresholds through the user interface or the step of the software automatically utilizing the second thresholds based upon an input from the proximity sensor. In this way a vacation mode can be entered where a burglar use or other unexpected fluid flow use may be quickly determined and the control device closed and an alert message sent to the user. Also, in this way use of the fluid can be better controlled based upon the movements of the user within a building or structure.

Other features and advantages of the present invention will become apparent from the following more detailed description, when taken in conjunction with the accompanying drawings, which illustrate, by way of example, the principles of the invention.

BRIEF DESCRIPTION OF DRAWINGS

The accompanying drawings illustrate the invention. In such drawings.

DETAILED DESCRIPTION

Figure 1:
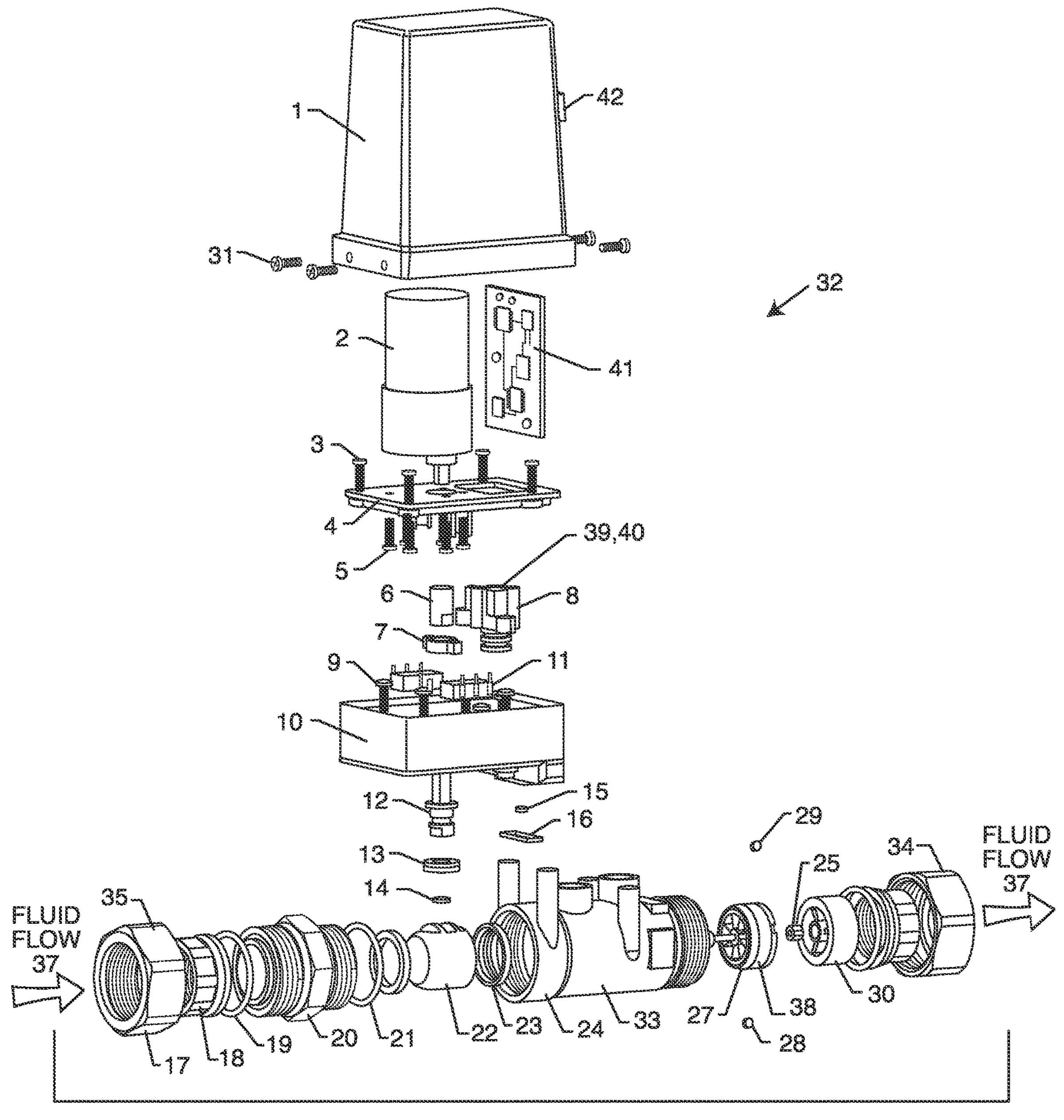
FIG. 1 is an exploded perspective view of an exemplary control device embodying the present invention.
Figure 2:
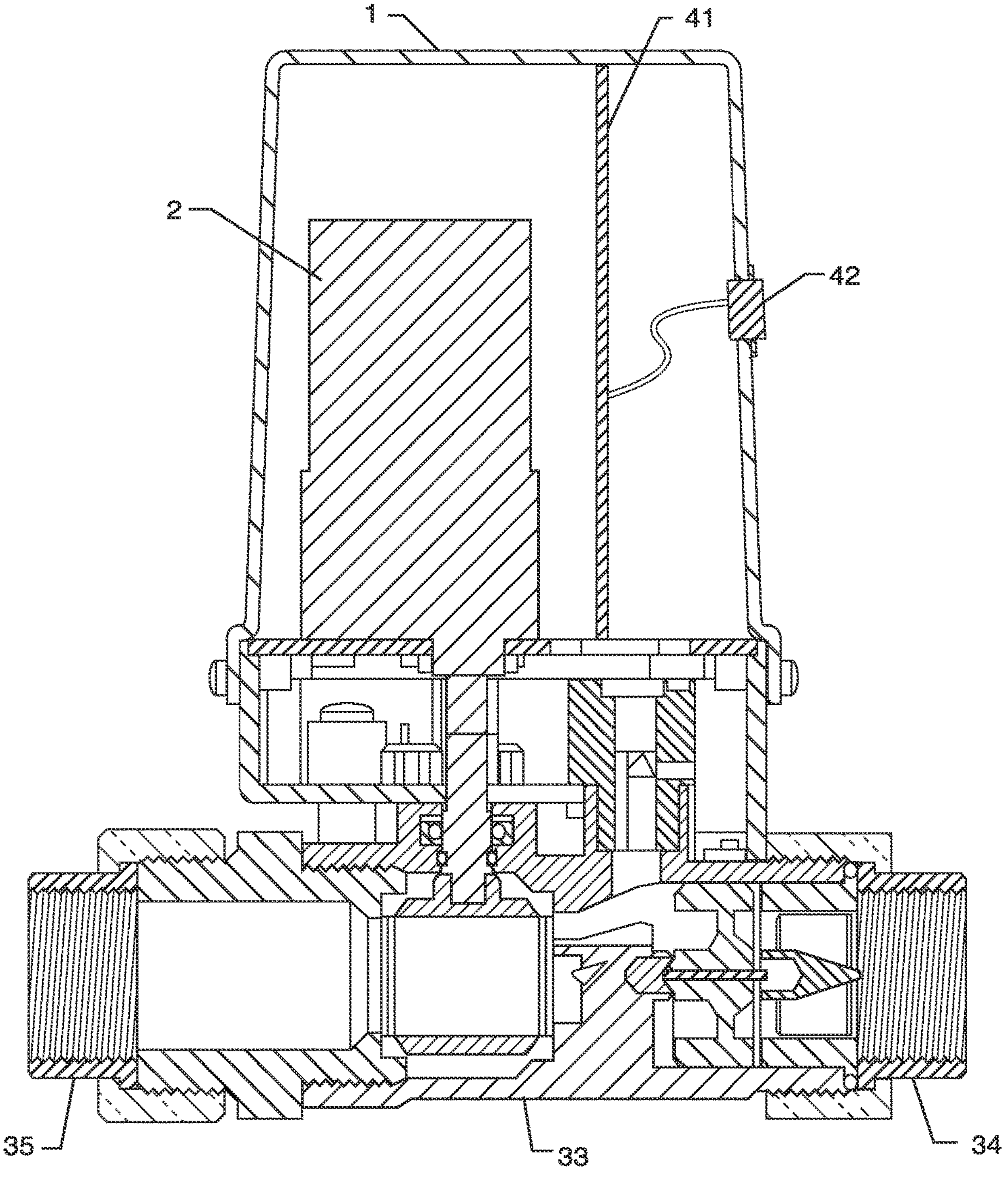
FIG. 2 is a sectional view taken through the assembled structure of FIG. 1.

FIG. 1 is an exploded perspective view of an exemplary control device 32 embodying the present invention. Each control device 32 includes a fluid pipe section 33 including a fluid inlet 35 and a fluid outlet 34 configured to be connectable in series to a fluid pipe 36. As shown in this particular embodiment, a brass union nut 17 screws onto an adapter 20 to retain the tail piece that is in turn attached to the inlet pipe. This attachment is sealed by the union ring 18.

A fluid valve 22 is coupled in series within the fluid pipe section 33 and is housed in the valve body 24. The fluid valve 22 controls a fluid flow 37 through the fluid pipe section 33. The adapter 20 abuts an adapter o-ring 21 and captures the ball valve 22 along with the plastic balls seats 23 against the valve body 24.

The motor 2 is coupled to the ball valve 22 through the motor coupling 6 which engages a limit stop 7. The valve stem 12 engages the motor coupling 6 and also the ball valve 22. The valve stem 12 also slips through the spring seal 13 and the o-ring 14 for providing a water tight seal. The tactile switches 11 indicate the position of the valve ball 22. The motor 2 may be directly connected to the ball valve 22 as shown or may be connected through a gear reduction system (not shown). Many gear reduction systems known to those skilled in the art may be used to effectively couple the motor 2 to the ball valve 22 such as belts, pulleys or gears. In this particular embodiment a ball valve 22 is used, but it is understood that other fluid valves could be utilized such as a gate valve, cylinder valve, globe valve, butterfly valve, diaphragm valve or needle valve. The motor 2 is connected to a motor baseplate 4 by screws 5. Screws 3 then fasten the baseplate 4 to the enclosure 10.

As can be seen much of these parts are captured in the enclosure 10. A cover or housing 1 encloses the motor 2 and other associated parts. It is understood that the enclosure 10 and cover 1 can be fashioned in a multitude of shapes and sizes and is not to be limited by this particular shape and configuration. Screws 9 help hold the enclosure 2 to the valve body 24. It is understood that the enclosure 10 and valve body 24 could be formed as a single part and not two separate parts attached with screws or fasteners 9. Screws 31 hold the cover 1 to the enclosure 10. It is understood that the cover 1 could be snap fitted to the enclosure 10 or other various latches and fasteners utilized.

A flow sensor 38 as shown herein includes a turbine wheel 27 that utilizes a magnet 28 and a turbine counter weight 29 placed opposite the turbine magnet 28 for balance. A turbine shaft 26 spins within the turbine bearing 25. A fluid flow 37 flows through the rear bearing support 30.

A Hall Effect sensor 15 and flow sensor PCB 16 are utilized to sense the rotation of the turbine wheel 27 due to the magnet 28. A Hall Effect sensor is a transducer that varies its output voltage in response to a magnetic field. Hall Effect sensors are commonly used to time the speed of wheels and shafts, such as for internal combustion engine ignition timing, tachometers and anti-lock braking systems. Herein, they are used to detect the position of the permanent magnet 28. It is understood by one skilled in the art that other sensors could be utilized to determine the flow rate of the fluid. Other sensors include a thermal mass flow sensors, an ultrasonic flow sensors and a piston sensor. In place of the Hall Effect sensor 15 a reed switch can also be used.

A transducer base 8 includes a temperature sensor 39 and a pressure sensor 40. The temperature sensor 39, pressure sensor 40 and Hall Effect sensor 15 all send their information to a control device processor 41. Tactile switches 11 are also connected to processor 41 and the motor is also powered by the processor 41. The control device processor 41 can then send the information to an input/output port 42. The control device 32 may also be powered through port 42.

Figure 7:
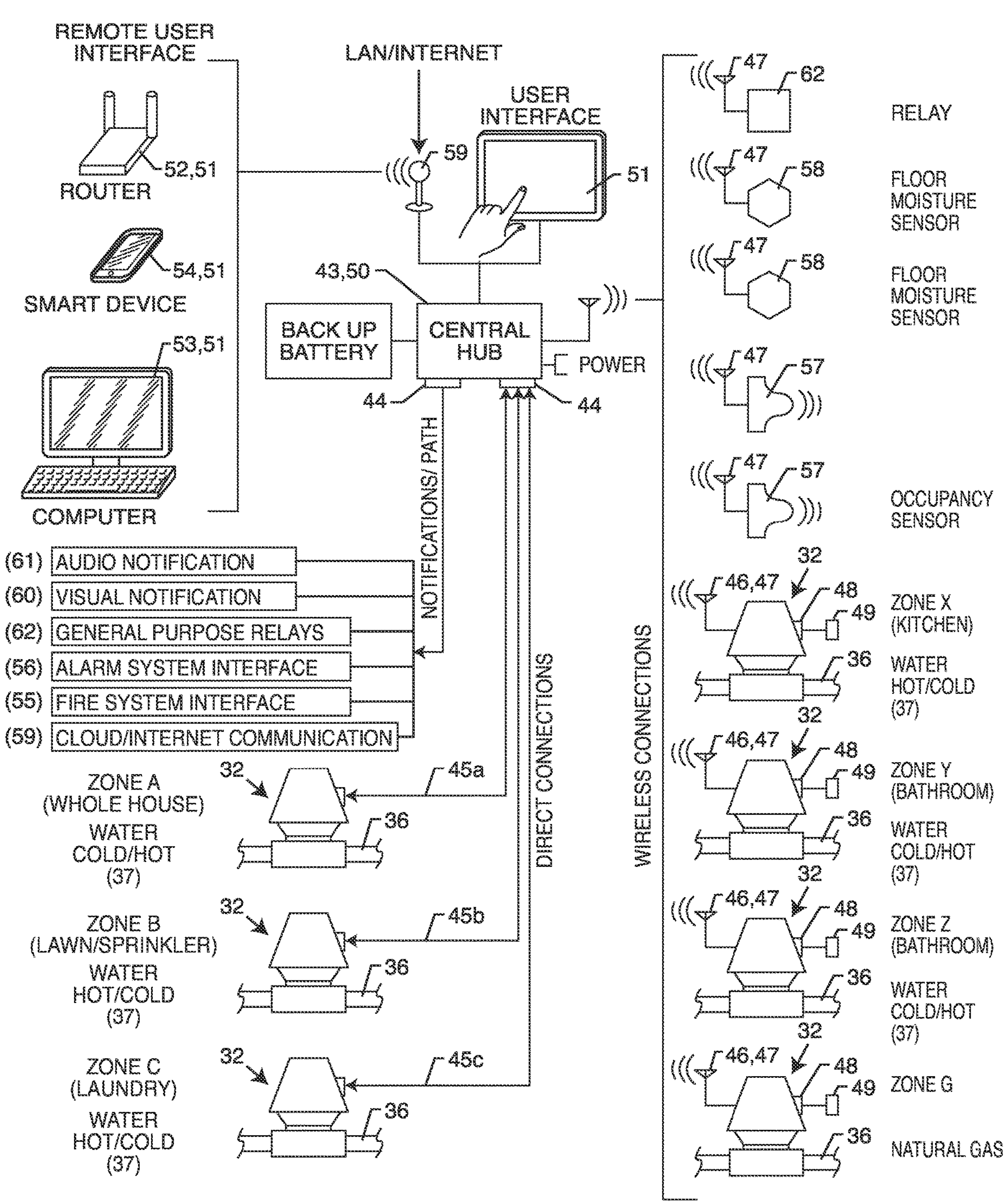
FIG. 7 is a schematic overview of an exemplary fluid monitoring and control system embodying the present invention.

The control device 32 communicates with a central hub 43. The communication can be from the input/output port 42 of the control device 32 to an input/output port 44 on the central hub 43. This means a hardwire 45 is connected between the control device 32 and the central hub 43. FIG. 7 shows three hardwires 45*a-c* however a single or a multitude of hardwires 45 and control devices 32 may be used.

Figure 3:
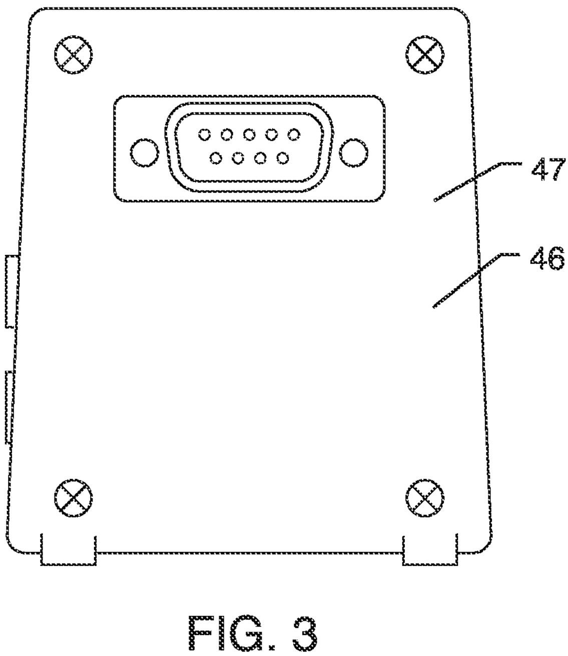
FIG. 3 is a front view of an exemplary wireless communication module attachable to the structure of FIG. 1.
Figure 4:
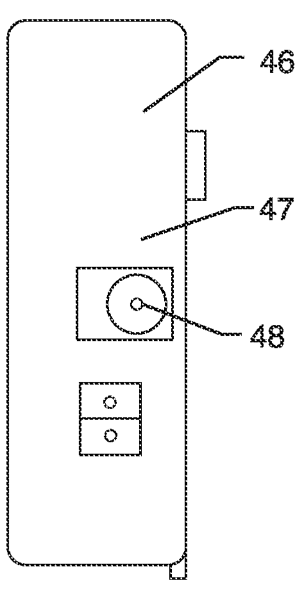
FIG. 4 is a side view of the structure of FIG. 3.
Figure 5:
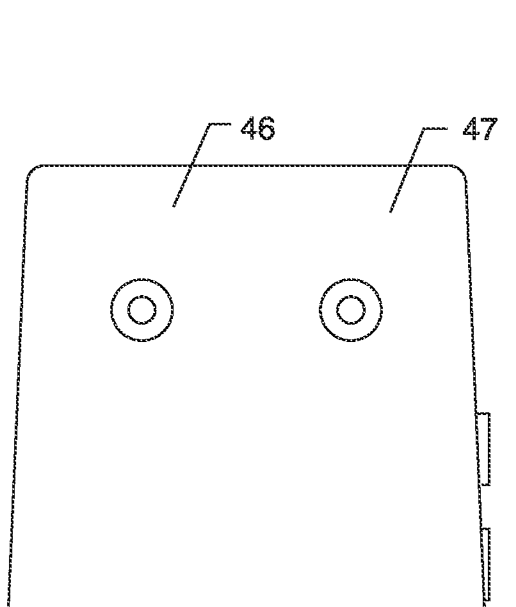
FIG. 5 is a back view of the structure of FIG. 3.
Figure 6:
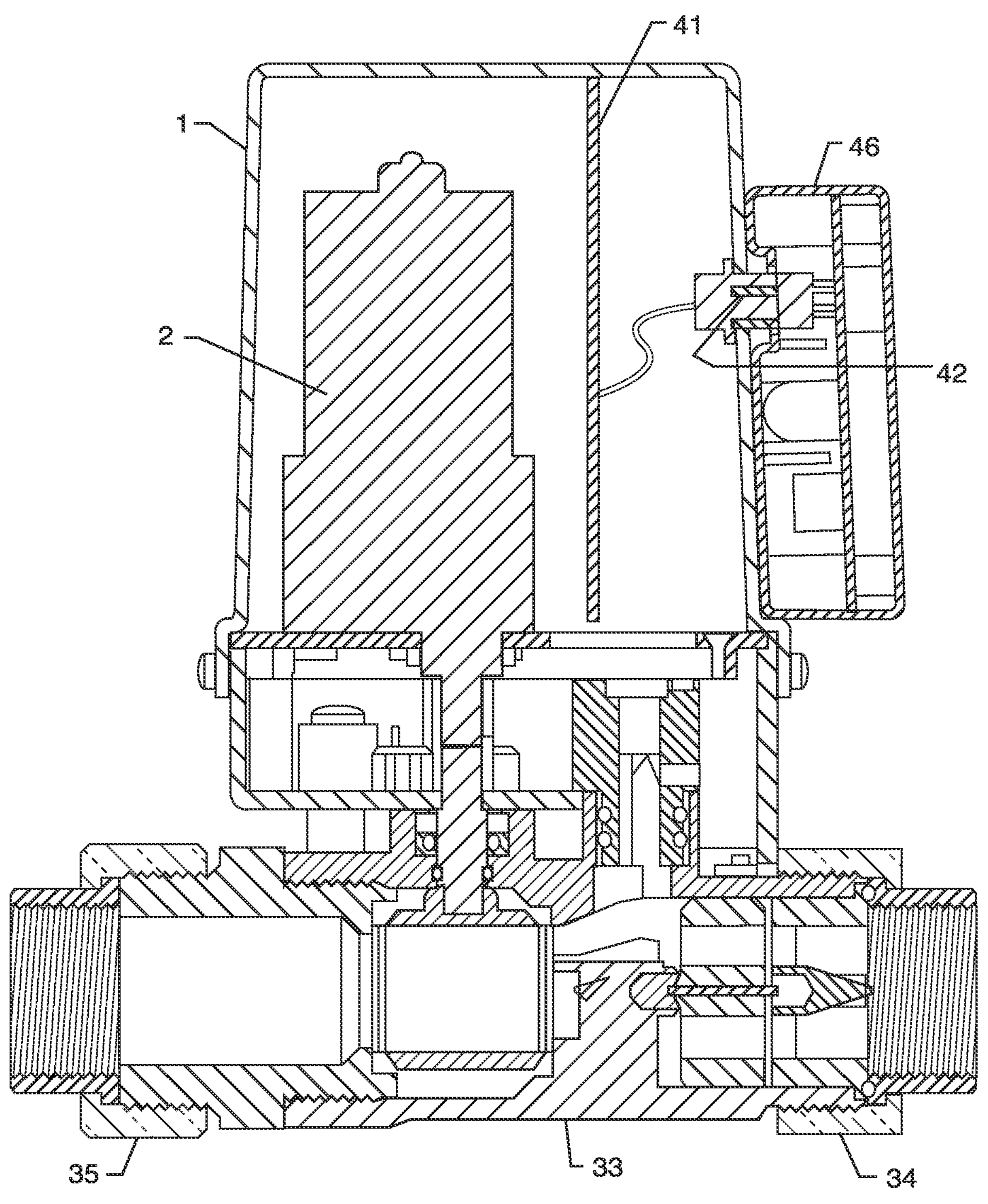
FIG. 6 is a sectional view similar to FIG. 2 now showing the wireless communication module.

Alternatively, a modular unit 46 as seen in FIGS. 3-5 can be attached to the cover 1 as seen in FIG. 6. The modular unit 46 contains a wireless communication transmitter and receiver 47. The modular unit 46 is designed to connect to the input/output port 42 of the control device 32. The modular unit 46 also contains a power input 48 for an external battery 49 or from a hardwired power supply line (not shown). The modular unit 46 can be utilized or not utilized and this does not change the design the control device 32 as this adds the adaptability and functionality of the system.

As is best seen in FIG. 7, the central hub 43 controls all of the control devices 32. FIG. 7 is just one embodiment the system can encompass, as many variations of FIG. & are possible. The central hub 43 has a central processor 50 and an input/output port 44. The central hub 43 also includes a user interface 51. The user interface 51 may be a touch computer screen or a screen and a keyboard. The user interface 51 may be physically attached or formed with the central hub 43. This means the central hub 43 can be mounted within an optimal location within a building or structure. After the initial setup the system will be functional without the local interface.

Alternatively, the user interface 51 may also include a remote user interface wirelessly connected via a router 52 or hardwire connected to the central hub 43. For example, the user interface may include a remote computer and keyboard 53 accessible over the Internet through a LAN connection or wireless connection 59. A smart phone or portable electronic device 54 could even access the central hub 43 via the cloud/internet 59 or specialized software running in the cloud or on the central hub 43 itself.

Alternatively, the user interface 51 could also be incorporated into a fire system 55 or a burglar/alarm system 56. Many fire systems and burglar/alarm systems already run sophisticated software already. One skilled in the art could adapt the central hub 43 to receive and send commands via the fire and burglar/alarm systems.

Even if the fire or burglar systems do not control the central hub 43, they can still send and receive information to the central hub 43. For instance, if the fire alarm is tripped, the central hub 43 could be configured to automatically close the valve on a control device controlling the flow of natural gas.

Other devices may also be hardwire connected or wirelessly connected to the central hub. This includes proximity/occupancy sensors 57 or moisture sensors 58. When a user is not located within the building, a proximity sensor can register this non-occurrence and shut various fluid flows. Alternatively, when a user is located in a certain location a fluid flow can be started. For instance, it is a common nuisance to have to wait a significant amount of time for hot water to reach a particular faucet. Some buildings constantly run a small amount of heated fluid through the pipes so that when needed hot water is quickly supplied. The present invention could be utilized to only provide this small amount of hot water flow based upon the proximity sensor. For instance, if a proximity sensor detected a user was near the bathroom the hot water to the shower could be started to pre-warm the water pipes. The signal generated by each sensor 57, 58 can either be used by one zone or multiple zones based on system set up.

The moisture sensor 58 can also send information to the central hub 43. For example, a moisture sensor 58 could be placed around a water heater, washing machine or under a sink to determine if a leak occurred. Alternatively, a moisture sensor could be placed within a basement to detect leaks. If a leak occurred, it could send a signal to the central hub 43 which would then shut the appropriate valve in a corresponding control device 32. Again, the moisture sensor 58 and occupancy sensor 57 could be directly connected to the central hub or wirelessly connected through a wireless communication transmitter and receiver 47.

Now understanding the structure of the present invention, many novel configurations may be utilized to create a custom system for a residence or commercial structure. FIG. 7 is just one example where three control devices 32 are utilized directly connected to the central hub and three control devices 32 are remotely connected via the modular unit 46 with the wireless communication transmitter and receiver 47. As can be seen, ZONE A is connected to the whole house. If water to the whole house needs to shut off it can by controlling just this single control device 32. The control device 32 in ZONE B is connected to the lawn/sprinkler system. This means that the lawn and sprinklers can be controlled from a single control device 32. For instance, if the residence is away from the home they can remotely turn off the flow of water to the sprinklers in case the news showed it had rained significantly and watering would be unneeded at this point. The control device for ZONE C controls the laundry room. If a floor moisture sensor 58 was placed within the laundry room, it could detect a leak and automatically turn just the flow of water off to the laundry room. This way, the water flow to the rest of the house would remain usable and flowing.

For locations that are further away, it may not be feasible or easy to directly connect the control device 32 to the central hub 43. This is where the wireless communication transmitter and receiver 47 are utilized. The control device 32 for ZONE X controls the kitchen. If work is needed to be performed in the kitchen to install new appliances or fix a leak, the control device 32 can just shut down the kitchen and not the rest of the house. Additionally, a moisture sensor 58 can be placed near the refrigerator to detect any leaks and automatically turn off the water. The control devices 32 for ZONE Y and ZONE Z control various bathrooms. It is very common for a shower or faucet to leak. Usually one valve controls the flow of water to the whole house. This means water to the whole house must be turned off when servicing any component in the piping system. With the present invention just a single bathroom can have the water turned off to easily allow maintenance to be performed while not disrupting the rest of the water supply.

Other uses not specifically covered in this disclosure are possible. Relays 62 can be utilized to send and receive information from the central hub 43 either directly or wirelessly to control various functions. The relays 62 are intended to be utilized just as easily as the rest of the components providing the user the ability to create a custom system. The relays 62 can be connected to any system or other use not directly mentioned in this disclosure. Relays 62 can be programed by a user to engage and create either a dry contact or produce a voltage based on variety of conditions.

Each individual control device 32 is configured to control and monitor all fluid flows including liquids, gas, air or any combination thereof. In this way the same control device 32 can be used for water or for natural gas. This increases the uses of the present invention to cover all fluids used in buildings. As shown herein, the control device 32 can control the flow of natural gas. If the fire alarm 56 or any device sends a signal, the natural gas can be shut off. For instance, a fire may be detected and the flow of gas should be shut down for safety. Also, if an earthquake occurs, this can damage pipes and creates leaks. The central hub 43 can shut down all control devices to ensure that no leaks are present.

Each control device measures all three states of a fluid: temperature, pressure and flow rate. In this way the control device can monitor all states of the fluid and create alarms, notifications or shut valves if the individual or any combination of values based on the desired algorithm exceeds a set threshold. For instance, if a pressure threshold was set at 75 psi and the water entering the house was above this, it would indicate that the pressure regulator for the house had failed and needed replaced. A warning signal or notification could be sent. For instance, a visual notification 60 or an auditory notification 61 could be sent by the central hub 43 itself or also sent to any of the remote user interfaces such as the router 52, the smart device 54 or the remote computer 53. If the temperature of the hot water was below a certain threshold, it could signal that the water heater was failing and send the user a notification or alarm. If the pressure to the water heater was rising above a threshold, it could signal that the water heater's blow off valve was malfunctioning and needed maintenance. If a small flow rate that was detected that was constant, it could signal a leak had occurred. By also measuring all states of the fluid, data on the usage and consumption of the fluid would also be available. A user could see exactly what zone was using the most fluid. This may be helpful in improving conservation of the fluid.

Through the software of the central hub 43, all of these notices and alerts for anything can be sent to the user interface or to the remote user interfaces. For example, if a leak was detected in the laundry room and the water shut off in ZONE C, a text message could be sent to the smart device 54. As one skilled in the art can now understand, the present invention can be configured in an endless multitude of ways and methods providing the user the ability to tailor the system to their own needs. The software controlling the central hub 43 can be an open platform so that others may easily modify and use it. Also, a simple user interface 51 and associated software can make programming the various control devices easy and effortless.

The software of the system can also be programmed to perform a learn mode. In some installations it may be difficult for a user to set the limits and parameters in a newly installed system. During a learn mode, for example two weeks, the system would monitor the usage and characteristics of the fluid under what is considered by the user as "Normal Conditions". Then, after the learn mode has completed and deployed, if the fluid characteristics stray outside of the bounds of the Normal Condition a notification can be sent. This added functionality would be helpful in identifying unusual occurrences that would normally go unnoticed.

The software is also configured to perform other novel methods described herein by utilizing the novel control devices 32. A zone isolation test (ZIT) can be performed by the software programmed into the central hub 43 controlling the individual control devices 32. A zone isolation test is when the central hub 43 closes a particular valve 22 at a preset time when it senses that a particular zone is not being used to then check for small leaks. For instance the system can be programmed to perform a zone isolation test once a day, once a week, once a month or any period of time desired. Alternatively, the system can use it's learn mode to determine the time and the day to perform the zone isolation test when downstream usage is most unlikely. Because the system can be programmed to perform the zone isolation test in off-peak hours it minimizes any impact a user might experience from a closed fluid line 36.

The zone isolation test isolates a downstream zone that is connected to a control device and monitors the pressure decay within the zone to then detect very small leaks that are not otherwise detected through other means, such as the flow rate sensor. A small leak can be a drip behind the wall that can cause mold or other water damage. It is very common for various plumbing fixtures to leak such as dripping faucets, leaky toilet valves or leaky appliances. Because the pressure decay due to a small leak is easier to detect than a very low flow rate due to a small leak, the pressure decay is one optimal way to identify small leaks.

Once a leak is detected, the system can send notifications on the user interface 51 or send notifications through the remote user interfaces such as texts or voicemail on the smart devices 54 or by email through the Internet to a remote computer 53. This then would notify the user of a problem so that corrective action could be taken or a zone can be configured to be immediately shut down upon detection of a small leak. Any of the notification methods discussed herein could be utilized.

Other novel flow analysis methods may be used to provide added capability to the present invention. For example, a total flow threshold may be set to occur over a defined period of time. For example, a total flow threshold may be set for a period of 6, 12 or 24 hours. If the total flow exceeds this threshold it could indicate that a major leak has occurred and all control devices 32 should close their respective valves 22. Because each control device 32 has a flow sensor 38, only the control devices 32 with the excess flow could be shut.

The total flow thresholds can also be adjusted automatically depending upon the proximity sensors or other means. For instance, the user may set the system into a vacation mode. In vacation mode the thresholds are very small as any use of fluid could signal a problem. Furthermore, a fluid flow during vacation mode could indicate that an intruder was present and used a fluid supply. For instance a burglar could drink a glass of water or flush the toilet which could then alert the authorities.

Various modes of operation include: a) a normal operation with confirmation of user presence (proximity/presence sensor activation); b) a normal operation without user presence; c) a vacation mode; and d) a manual mode that can be used for test of individual system components or operating each device valve manually.

As can be understood by those skilled in the art, the present invention can have other devices (wired or wireless) added to the system at any time to provide added capability and functionality. The present invention is not to be limited to just the devices disclosed herein as the present invention can detect and integrate a variety of devices and inputs.

As is taught herein, the previous embodiments disclosed monitoring and controlling the water that is used in a dwelling by the occupants. These technologies may be designed for dwellings with occupants and the parameters that provide notifications or actions to shut the water off may be configured and based on occupancy or offer machine learning to set its own parameters based on an occupant's usage patterns and/or behavior. Alternative modes of operation may be based on occupants being home or away, such as a maintenance mode or an inactive mode.

However, there is often a long period of time from the time plumbing system in a structure is connected to and pressurized with water until occupants actually move in. This is a period of time where the water system may be most venerable because of the following: vandalism; issues with plumbing materials and workmanship; point of use fixtures installation and malfunctioning; appliance malfunctioning, a point of use being left running inadvertently by tradesmen and the like. Unfortunately, builders may be not present when such issues occur which could then lead to extensive damage and expensive problems. Accordingly, builders and contractors are exposed to hundreds of millions of dollars of liability due to these factors.

Therefore, the present invention has created a pre-occupancy (preoccupation) mode which can also be referred to as a "Builder Mode" and/or a "Construction Mode". The creation of a pre-occupancy mode in water monitoring and control devices allows the builder/contractor to protect the dwelling from the time water is turned on to the dwelling and the pipes are pressurized with water to until the dwelling is permanently occupied. Normally in this period the only utility that is available to the construction site is electricity and that may be limited to certain hours only. Accordingly, the present invention may also include a battery pack and/or battery back-up device such that power can be provided to the device even if local power is intermittent or not available to the site. The pre-occupancy mode may be configured to: not require Wi-Fi or internet connection; not require any pairing; and/or to enter pre-occupancy mode as long as the device is electrically connected while mechanically connected to a pressurized fluid system. Then, at a later point in time, the occupants can pair the device for permanent use without uninstalling the device form plumbing.

In such a pre-occupancy mode the device will protect the dwelling based on a set of preset parameters that does not change with usage pattern but may vary at different times of the day. For example, the parameters may be much tighter at night when construction crews are not present. One or more sets of preset parameters may be installed by the manufacturer of the device or optionally may be provided to the builder to set custom parameters when installing the device. Furthermore, optionally the device can modify the preset parameters with a local fluid monitoring and control system such as a smart phone.

In regards to how the device works, upon initial installation and after powering up the device, the embedded software may be configured to automatically default to the pre-occupancy mode. The device can be configured to start providing protection when the system is pressurized with pressures over a preset amount. As suggested, the preset pressure amount can also be set before the device is sold for installation. Once a preset pressure is detected, this may also then trigger a process within the software that the device is connected to pressurized media. This may then activate the pre-occupancy mode and software which can then start running various tests and monitoring routines based on preset parameters.

The test may include but not be limited to one or more of the following: pressure decay test to detect small leaks; maximum flow rate; maximum flow duration; maximum per event usage; combination of any or all the above with pressure; and/or a combination of any or all the above with temperature.

Because in the pre-occupancy mode the device may not send its normal warnings through paired devices, notifications can now be either be in the form of valve shut off or status light color change and/or lighting pattern. Additionally, an audible alarm may be part of the device that can indicate an issue has occurred. The device may also have a display that could communicate various conditions. Even though the device may not be connected to the internet or to a smart device, either through the use of sound, lights (LEDs) or a display the device may be able to communicate its current status.

The device may further be programed by means of one or more switches and LEDs (multi-color or mono-color) that are built into the device. A combination of switch presses and status LEDs can indicate the alternative parameter settings.

As can be understood by those skilled in the art, the pre-occupation mode still allows the device to provide value to the builder even though the device has not been connected/paired to the internet or to a smart device through local communication (such as Bluetooth or alike). The pre-occupation mode allows the device to operate and perform various tests without such connectivity and then is able to communicate the status through lights, displays, sounds or shut the water to the site.

The pre-occupation mode may also be configured to search for additional similar units. Typically, in construction each house may have a device installed. Therefore, closely disposed devices may be able to communicate with one another or form a mesh network. This feature provides the means to simplify the management at the sites with many devices in the same proximity (such as track housing sites) to set update parameters or make changes to all devices or one device through one or more end points. For example, a first device that experiences a problem may then be able to communicate with a second (third, fourth, fifth, etc.) device such that these other devices could also display the warning or provide the site management with specific notifications. Depending on the system configuration, a builder looking at device number 15, may be able to see device number 15 and understand that device number 6 is experiencing a problem.

Furthermore, because the devices may all be able to communicate with one another, if one device is connected to the internet or to a smart device, all of the other devices may also be controlled and monitored through this one device. Therefore, a builder can use a fluid monitoring and control system such as a smart phone running a custom made application that can then communicate with just one of the devices and yet be able to see the status and health of all the devices that are coupled together through the track housing while using the pre-occupancy mode.

There may be several ways that the device is configured to enter into a pre-occupancy mode, as the following ways are examples but are not intended to cover all the variations possible that are now understandable by those skilled in the art in light of the present teaching. For example, one way is that the control device processor is configured to enter into a pre-occupany mode the first time the device is powered. The device will stay in the pre-occupancy mode until it connects to the fluid monitoring and control system where it can then be turned off by the user.

A second way is where the control device processor is configured to enter into a pre-occupancy mode when all of the following occurs: when it is electrically powered; when it has not been previously wirelessly connected to the fluid monitoring and control system; and when the pressure sensor detects a pre-occupancy pressure threshold has been reached indicating the fluid pipe section has been fluidically connected in series to the fluid pipe.

A third way is where the control device processor is configured to enter into a pre-occupancy mode when first powered and remain in the pre-occupancy mode until connected to the fluid monitoring and control system and commanded to exit the pre-occupancy mode.

A fourth way is to include a button that a user can depress to default the control device processor into the pre-occupancy mode.

A fifth way is to include an insert that can be manually removed by the end user, where when the insert is still installed the control device processor is configured to remain in the pre-occupancy mode. As can be seen, there are a multitude of ways that the device can be configured to enter into the pre-occupancy mode such that it protects the building even before the end user takes control the property.

A sixth way is to configure the device to default upon initial start-up in the pre-occupancy mode. Thereafter, when the device is paired for the first time to the fluid monitoring and control system, then will it not go back to the pre-occupancy mode but rather stay in the new settings obtained from the pairing to the fluid monitoring and control system. As can be understood by these teachings, any of the ways discussed herein may be combined together to form a multitude of ways of activating the preoccupancy mode.

Although several embodiments have been described in detail for purposes of illustration, various modifications may be made to each without departing from the scope and spirit of the invention. Accordingly, the invention is not to be limited, except as by the appended claims

What is claimed is:

1. A fluid control device, comprising:

a fluid pipe section body including an internal fluid passage extending from a fluid inlet to a fluid outlet;

a fluid valve assembled within the fluid passage of the fluid pipe section body and separating a fluid inlet side from a fluid outlet side, wherein the fluid inlet side corresponds to the fluid inlet of the fluid pipe section body and the fluid outlet side corresponds to the fluid outlet of the fluid pipe section body, the fluid valve controlling a fluid flow through the fluid passage of the fluid pipe section body, wherein the fluid valve comprises a ball valve disposed within the fluid passage and a valve stem connected with the ball valve and extending through an actuation port in the fluid pipe section body;

a control enclosure assembled to the fluid pipe section body;

an electric motor mounted to a base wall portion within the control enclosure and mechanically connected to the valve stem for actuation of the fluid valve;

a transducer base installed in a transducer port in the fluid pipe section body covered by the control enclosure, the transducer port intersecting with the fluid outlet side of the fluid passage of the fluid pipe section body, the transducer base including a pressure sensor for monitoring a pressure of the fluid flow within the fluid passage of the fluid pipe section body and a temperature sensor for monitoring a temperature of the fluid flow within the fluid passage of the fluid pipe section body;

a flow rate sensor connected to the fluid pipe section body for monitoring a flow rate of the fluid flow within the fluid passage of the fluid pipe section body;

a control device processor disposed within the control enclosure and electrically connected to the electric motor and electrically connected to the temperature sensor, the pressure sensor and the flow rate sensor; and a wireless communication transmitter retained with the control enclosure and electrically connected to the control device processor;

wherein the control device processor is configured to generate a user alert for wireless transmission by the wireless communication transmitter when the flow rate sensor indicates to the control device processor a flow condition exceeding a preset threshold.

2. The fluid control device of claim 1, wherein the flow rate sensor comprises an ultrasonic flow sensor.

3. The fluid control device of claim 1, wherein the flow rate sensor is on the fluid outlet side of the fluid passage.

4. The fluid control device of claim 1, wherein the wireless communication transmitter is contained in a modular unit attached to the control enclosure.

5. The fluid control device of claim 1, wherein the control device processor is configured to operate the electric motor to close the fluid valve when the flow rate sensor indicates to the control device processor an excess flow condition.

6. The fluid control device of claim 5, wherein the excess flow condition comprises a flow rate.

7. The fluid control device of claim 5, wherein the excess flow condition comprises a total flow over a predetermined time period.

8. The fluid control device of claim 1, wherein the flow condition comprises a flow rate.

9. The fluid control device of claim 1, wherein the flow condition comprises a total flow over a predetermined time period.

10. The fluid control device of claim 1, wherein the preset threshold is user adjustable.

11. The fluid control device of claim 10, wherein the preset threshold is user adjustable by operation of a smart phone.

12. The fluid control device of claim 1, wherein the control device processor is configured to generate the user alert for wireless transmission to a smart phone.

13. The fluid control device of claim 12, wherein the control device processor is configured to generate the user alert for wireless transmission to the smart phone via a central hub in wireless communication with the wireless communication transmitter.

14. The fluid control device of claim 1, wherein the control device processor is configured to operate the electric motor to close the fluid valve in response to a wireless shutoff signal received by the wireless communication transmitter.

15. The fluid control device of claim 1, wherein the control device processor is configured to operate the electric motor to close the fluid valve when the pressure sensor indicates to the control device processor an excess fluid pressure.

16. The fluid control device of claim 1, wherein the control device processor is configured to receive pressure measurement signals from the pressure sensor to detect a pressure decay on the fluid outlet side when the fluid valve is in the shutoff condition, and wherein the wireless communication transmitter is configured to wirelessly transmit an additional user alert in response to the control device processor identifying a leak corresponding to the detected pressure decay.

17. The fluid control device of claim 1, wherein the flow rate sensor includes one or more components installed in the fluid outlet of the fluid pipe section body.

18. In combination, the fluid control device of claim 1 and a moisture sensor remote from the fluid control device and configured to generate a wireless signal corresponding to moisture sensed by the moisture sensor, for directing operation of the control device processor to control movement of the fluid valve to a shutoff condition in response to generation of the wireless signal.

19. A fluid control device, comprising:

a fluid pipe section body including an internal fluid passage extending from a fluid inlet to a fluid outlet;

a fluid valve assembled within the fluid passage of the fluid pipe section body and separating a fluid inlet side from a fluid outlet side, wherein the fluid inlet side corresponds to the fluid inlet of the fluid pipe section body and the fluid outlet side corresponds to the fluid outlet of the fluid pipe section body, the fluid valve controlling a fluid flow through the fluid passage of the fluid pipe section body, wherein the fluid valve comprises a ball valve disposed within the fluid passage and a valve stem connected with the ball valve and extending through an actuation port in the fluid pipe section body;

a control enclosure assembled to the fluid pipe section body;

an electric motor mounted to a base wall portion within the control enclosure and mechanically connected to the valve stem for actuation of the fluid valve;

a transducer base installed in a transducer port in the fluid pipe section body covered by the control enclosure, the transducer port intersecting with the fluid outlet side of the fluid passage of the fluid pipe section body, the transducer base including a pressure sensor for monitoring a pressure of the fluid flow within the fluid passage of the fluid pipe section body;

a flow rate sensor connected to the fluid pipe section body for monitoring a flow rate of the fluid flow within the fluid passage of the fluid pipe section body;

a control device processor disposed within the control enclosure and electrically connected to the electric motor and electrically connected to the pressure sensor and the flow rate sensor; and a wireless communication transmitter retained with the control enclosure and electrically connected to the control device processor;

wherein the control device processor is configured to generate a user alert for wireless transmission by the wireless communication transmitter when the flow rate sensor indicates to the control device processor a flow condition exceeding a preset threshold.

20. A fluid control device, comprising:

a fluid pipe section body including an internal fluid passage extending from a fluid inlet to a fluid outlet;

a fluid valve assembled within the fluid passage of the fluid pipe section body and separating a fluid inlet side from a fluid outlet side, wherein the fluid inlet side corresponds to the fluid inlet of the fluid pipe section body and the fluid outlet side corresponds to the fluid outlet of the fluid pipe section body, the fluid valve controlling a fluid flow through the fluid passage of the fluid pipe section body, wherein the fluid valve comprises a ball valve disposed within the fluid passage and a valve stem connected with the ball valve and extending through an actuation port in the fluid pipe section body;

an adapter assembled with the fluid pipe section body to retain the ball valve within the fluid passage;

a control enclosure assembled to the fluid pipe section body;

an electric motor mounted to a base wall portion within the control enclosure and mechanically connected to the valve stem for actuation of the fluid valve;

a transducer base installed in a transducer port in the fluid pipe section body covered by the control enclosure, the transducer port intersecting with the fluid outlet side of the fluid passage of the fluid pipe section body, the transducer base including a pressure sensor for monitoring a pressure of the fluid flow within the fluid passage of the fluid pipe section body and a temperature sensor for monitoring a temperature of the fluid flow within the fluid passage of the fluid pipe section body;

a flow rate sensor connected to the fluid pipe section body, with one or more components installed in the fluid outlet of the fluid pipe section body, for monitoring a flow rate of the fluid flow within the fluid passage of the fluid pipe section body;

a control device processor disposed within the control enclosure and electrically connected to the electric motor and electrically connected to the temperature sensor, the pressure sensor and the flow rate sensor; and a wireless communication transmitter retained with the control enclosure and electrically connected to the control device processor;

wherein the control device processor is configured to generate a user alert for wireless transmission by the wireless communication transmitter when the flow rate sensor indicates to the control device processor a flow condition exceeding a preset flow threshold;

wherein the control device processor is configured to operate the electric motor to close the fluid valve when the flow rate sensor indicates to the control device processor an excess flow condition;

wherein the control device processor is configured to operate the electric motor to close the fluid valve in response to a wireless shutoff signal received by the wireless communication transmitter; and wherein the wireless communication transmitter is configured to wirelessly transmit one or more additional user alerts in response to the control device processor identifying any one or more of a temperature beyond a preset temperature threshold and a pressure beyond a preset pressure threshold.

* * * * *